(12) United States Patent
Kim et al.

(10) Patent No.: US 8,218,855 B2
(45) Date of Patent: Jul. 10, 2012

(54) METHOD AND APPARATUS FOR RECEIVING MULTIVIEW CAMERA PARAMETERS FOR STEREOSCOPIC IMAGE, AND METHOD AND APPARATUS FOR TRANSMITTING MULTIVIEW CAMERA PARAMETERS FOR STEREOSCOPIC IMAGE

(75) Inventors: Yong-tae Kim, Seoul (KR); Jae-seung Kim, Yongin-si (KR); Dae-sik Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1028 days.

(21) Appl. No.: 12/174,174

(22) Filed: Jul. 16, 2008

(65) Prior Publication Data

US 2009/0092311 A1     Apr. 9, 2009

Related U.S. Application Data

(60) Provisional application No. 60/977,466, filed on Oct. 4, 2007.

(30) Foreign Application Priority Data

Nov. 26, 2007  (KR) .................. 10-2007-0120975

(51) Int. Cl.
    *G06K 9/00*        (2006.01)
(52) U.S. Cl. ............................................ 382/154
(58) Field of Classification Search .................. 382/154
    See application file for complete search history.

(56) References Cited

U.S. PATENT DOCUMENTS

| | | | |
|---|---|---|---|
| 6,621,921 B1 * | 9/2003 | Matsugu et al. | 382/154 |
| 7,423,666 B2 * | 9/2008 | Sakakibara et al. | 348/136 |
| 7,429,999 B2 * | 9/2008 | Poulin et al. | 348/187 |
| 2005/0147324 A1 * | 7/2005 | Kwoh et al. | 382/293 |

* cited by examiner

*Primary Examiner* — John Strege
(74) *Attorney, Agent, or Firm* — Sughrue Mion, PLLC

(57) ABSTRACT

Provided is a method of receiving multiview camera parameters for a stereoscopic image. The method includes: extracting multiview camera parameter information for a predetermined data section from a received stereoscopic image data stream; extracting matrix information including at least one of translation matrix information and rotation matrix information for the predetermined data section from the multiview camera parameter information; and restoring coordinate systems of multiview cameras by using the extracted matrix information.

25 Claims, 14 Drawing Sheets

FIG. 5B

|  | TRANSLATION MATRIX | ROTATION MATRIX |
|---|---|---|
| FIRST VIEW CAMERA PARAMETER | (0, 0, 0) | $R = f(\alpha, -\beta/2, \gamma)$ |
| SECOND VIEW CAMERA PARAMETER | $(t_X, 0, 0)$ | $R = f(\alpha, \beta/2, \gamma)$ |

FIG. 5C

|  | TRANSLATION MATRIX | ROTATION MATRIX |
|---|---|---|
| BASE VIEW CAMERA PARAMETER | (0, 0, 0) | $f(0, 0, 0)$ |
| ADDITIONAL VIEW CAMERA PARAMETER | $(t_X, t_Y, t_Z)$ | $R = f(\alpha, \beta, \gamma)$ |

| | | | |
|---|---|---|---|
| 630 — ftyp | | | file type and compatibility<br>major_brand = "ssav" |
| | ... | | |
| 610 — moov | | | container for all the metadata of timed resources |
| | ... | | |
| | trak | | container for an individual track or<br>stream indicate Main AV data or auxiliary data |
| 670 — | ... | | |
| | ... | | |
| 620 — mdat | | | media data container meta |
| 640 — meta | | | Metadata |
| | ... | | |
| 650 — | tdcp | | Three dimensional camera parameters |

FIG. 7

| |
|---|
| 3DCamParams( ) { |
|     Is_CamParams; |
|     CamArrange; |
|     if(Is_CamParams){ |
|         baseline_distance; |
|         focal_length; |
|         if(CamArrange){ |
|             rotation[3]; |
|         } |
|     num_of_AdditionalParams; |
|     for(i = 0; i < num_of_AdditionalParams; i++ ){ |
|         AdditionalParams; |
|     } |
| } |

| CamArrange | IDENTIFICATION |
|---|---|
| 0 | PARALLEL |
| 1 | CONVERGENT |
| 2 | PARALLEL CONVERGENT |
| 3~15 | USER PRIVATE |

FIG. 9A

Box type : 'tdcp'
Container : Meta box ('meta')
Mandatory : No
Quantity : Zero or one Syntax
aligne(8) class ThreeDimensionCP extends FullBox('tdcp', version = 0.0) {
        unsigned int(1)        Is_CamParams;
        unsigned int(4)        CamArrange;
        if(Is_CamParams){

910 —
                unsigned int(16) baseline_distance;  — 920
                unsigned int(16) focal_length;
                if(CamArrange){
                      unsigned int(16) rotation[3];
                }
                unsigned int(4)  num_of_AdditionalParams;
                for(i = 0 ; i < num_of_AdditionalParams; i++){
                      unsigned int(16) AdditionalParams;
                }
        }
}

FIG. 9B

```
Box type : 'tdcp'
Container : Meta box ('meta')
Mandatory : No
Quantity : Zero or one
Syntax
aligne(8) class ThreeDimensionCP extends FullBox('tdcp', version = 0, 0) {
        unsigned int (1)      Is_CamParams;
        unsigned int (4)      CamArrange;
        if(Is_CamParams){
                unsigned int (16) translation[3];    —940
                unsigned int (16) focal_length;
                if(CamArrange){
                        unsigned int (16)
930 —   }
                unsigned int (4)   num_of_AdditionalParams;
                for(i = 0 ; i < num_of_AdditionalParams; i++){
                        unsigned int (16)  AdditionalParams;
                }
        }
}
```

FIG. 9C

```
aligne(8) class ThreeDimensionCP extends FullBox('tdcp' version = 0, 0) {
        unsigned int (1)         Is_CamParams;
        unsigned int (4)         CamArrange;
        if(Is_CamParams){
                unsigned int (4)   num_of_AdditionalParams;
                unsigned int (32)  count;
950 ──   for(j=0;j<count;j++)
                {
                        unsigned int (16) ES_ID;    ── 970
                        unsigned int (16) offset;   ── 972
                        unsigned int (16) length;   ── 974
                                unsigned int (16) translation[3];  ── 990
                                unsigned int (16) focal_length;
                                if(CamArrange){
960 ──     980 ──                       unsigned int (16) rotation[3];
                                }
                                for(i = 0 ; i < num_of_AdditionalParams; i++){
                                        unsigned int (16)  AdditionalParams;
                                }
                }
        }
}
```

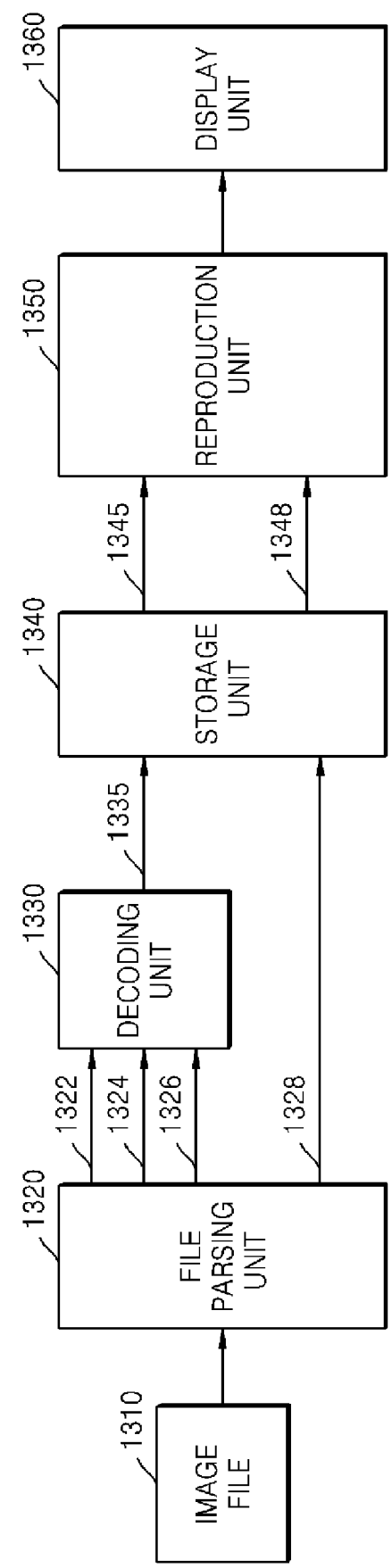

METHOD AND APPARATUS FOR RECEIVING MULTIVIEW CAMERA PARAMETERS FOR STEREOSCOPIC IMAGE, AND METHOD AND APPARATUS FOR TRANSMITTING MULTIVIEW CAMERA PARAMETERS FOR STEREOSCOPIC IMAGE

CROSS-REFERENCE TO RELATED PATENT APPLICATION

This application claims priority of U.S. Provisional Patent Application No. 60/977,466, filed on Oct. 4, 2007, in the U.S. Patent and Trademark Office, and Korean Patent Application No. 10-2007-0120975 filed on Nov. 26, 2007, in the Korean Intellectual Property Office, the disclosures of which are incorporated herein in their entirety by reference.

BACKGROUND OF THE INVENTION

1. Field of the Invention

Methods and apparatuses consistent with the present invention relate to a receiving multiview camera parameters for a stereoscopic image, and transmitting multiview camera parameters for a stereoscopic image, and more particularly, to a method and apparatus for efficiently receiving or transmitting multiview camera parameters by redefining multiview camera parameters for a stereoscopic image.

2. Description of the Related Art

Camera parameters for a stereoscopic image are used in various image processing applications including disparity estimation using an Epipolar line constraint and stereoscopic image rectification. Camera parameters are also used to generate low fatigue parameters or fatigue reduction algorithms by analogizing environmental conditions when an image is obtained. However, a standard format for the storage of camera parameters for a stereoscopic image is yet to be developed.

FIG. 1 illustrates a relationship between a world coordinate system 110 and a camera coordinate system 120. The world coordinate system 110 has an $X_W$ axis, a $Y_W$ axis, and a $Z_W$ axis, and the camera coordinate system 120 has an $X_C$ axis, a $Y_C$ axis, and a $Z_C$ axis. An origin of the world coordinate system 110 is spaced apart from an origin of the camera coordinate system 120 by a distance t, and the camera coordinate system 120 is rotated with respect to the world coordinate system 110 by an angle R. An arbitrary point P is expressed as $P_W$ in the world coordinate system 110, and expressed as $P_C$ in the camera coordinate system 120. A relationship between the world coordinate system 110 and the camera coordinate system 120 will now be explained with reference to Equation 1.

$$M_C = R^{-1} M_W - R^{-1} t \qquad (1)$$

where $M_C$ and $M_W$ are arbitrary points in the coordinate systems 110 and 120, R is a rotation matrix of the camera coordinate system 120 based on the world coordinate system 110, and t is a distance between the world coordinate system 110 and the camera coordinate system 120.

FIG. 2A illustrates a relationship between a camera coordinate system 210 and a two-dimensional image coordinate system 220.

The camera coordinate system 210 has an $X_C$ axis, a $Y_C$ axis, and a $Z_C$ axis, and the two-dimensional image coordinate system 220 is displayed by a real display device. An object with coordinates (X, Y, Z) in the camera coordinate system 210 is imaged at a point (x, y, f) in the two-dimensional image coordinate system 220. A relationship between the coordinates (X, Y, Z) and (x, y, f) is given by Equation 2, and x and y are expressed by Equation 3.

$$f:Z = x:X$$

$$f:Z = y:Y \qquad (2)$$

$$x = f \times X/Z$$

$$y = f \times Y/Z \qquad (3)$$

FIG. 2B illustrates a relationship between a camera coordinate system 210 and an arbitrary point in an image.

Reference numeral 220 denotes a coordinate system of a scene which is imaged in the camera coordinate system 210, and reference numeral 230 denotes an image coordinate system 230.

It is assumed that a pixel pitch in the coordinate system 220 is $(s_X, s_Y)$, a center point of the coordinate system 220 is imaged at a point $(o_X, o_Y)$ of the image coordinate system 230, and a point (x, y) of the coordinate system 220 is imaged at a point $(x_{im}, y_{im})$ of the image coordinate system 230. A relationship between the image coordinate system 230 and the camera coordinate system 210 is expressed by $$x = -(x_{im} - o_X) \times s_X$$

$$y = -(y_{im} - o_Y) \times s_Y \qquad (4)$$

A point which is imaged in the image coordinate system 230 by an arbitrary point in the camera coordinate system 210 using Equations 3 and 4 is determined by $$x_{im} = -(f/s_X) \times (X/Z) + O_X$$

$$y_{im} = -(f/s_Y) \times (Y/Z) + O_Y \qquad (5)$$

The relationship between the camera coordinate system 210 and the image coordinate system 230 is expressed in matrix form by Equations 6 through 8.

$$s \times m = A \times M_C \qquad (6)$$

Equation 7 is derived from Equations 1 and 6.

$$s \times m = A \times (R^{-1} M_W - R^{-1} t) \qquad (7)$$

A matrix A for a focal length, an aspect ratio of an image, and a center point $(o_X, o_Y)$ which are intrinsic parameters is given by $$A = \begin{pmatrix} -f/s_X & 0 & o_X \\ 0 & -f/s_Y & o_Y \\ 0 & 0 & 1 \end{pmatrix}. \qquad (8)$$

Accordingly, when camera parameters are transmitted, a rotation angle between coordinate systems and a translation should be transmitted as extrinsic parameters, and a focal length, an aspect ratio of an image, and a center point should be transmitted as intrinsic parameters.

SUMMARY OF THE INVENTION

The present invention provides a method of efficiently representing a multiview camera system for a stereoscopic image by redefining a smaller number of parameters. The present invention also provides a method of representing both a general camera system that does not provide a stereoscopic effect and a special camera system that provides a stereoscopic effect.

The present invention also provides a method of recording camera parameters in header information or metadata of a stereoscopic image data stream so that a stereoscopic image can be accurately reconstructed by using the stereoscopic image data. Throughout the specification, the language "record" or "recording" means "insert" or "inserting".

According to an aspect of the present invention, there is provided a method of receiving multiview camera parameters for a stereoscopic image, the method comprising: extracting multiview camera parameter information for a predetermined data section from a received stereoscopic image data stream; extracting matrix information including at least one of translation matrix information and rotation matrix information for the predetermined data section from the multiview camera parameter information; and restoring coordinate systems of multiview cameras by using the extracted matrix information.

The extracting of the matrix information may comprise extracting at least one of a camera focal length and additional parameter information for the predetermined data section, wherein the additional parameter information includes at least one of a center point of each camera and an aspect ratio of an image for the predetermined data section.

The restoring of the coordinate systems of the multiview cameras may comprise locating an origin of the coordinate system of the second view camera on one of coordinate axes of the coordinate system of the first view camera, wherein the extracting of the matrix information comprises determining as a parameter of the translation matrix information a translation value of the origin of the coordinate system of the second view camera with respect to the one of coordinate axes of the coordinate system of the first view camera.

The extracting of the matrix information may comprise determining as a parameter of the translation matrix information a translation value of an origin of the coordinate system of the second view camera based on the coordinate system of the first view camera.

The extracting of the matrix information may comprise determining whether the rotation matrix information is to be extracted according to an arrangement of the first view camera and the second view camera, wherein a parameter of the rotation matrix information is any one of: three axis rotation angle information of the second view camera with respect to the first view camera based on the first view camera; and rotation angle information of the first view camera and the second view camera which are symmetric about a predetermined axis.

The amount of the additional parameter information transmitted may be determined according to the degree of importance of the additional parameter information, and the degree of importance of the additional parameter information may have: a first level at which the additional parameter information is not transmitted; a second level at which only the aspect ratio of the image is transmitted; a third level at which the aspect ratio of the image and the center point of the first view camera are transmitted, and the center point of the second view camera is identical with the center point of the first view camera; and a fourth level at which the aspect ratio of the image, the center point of the first view camera, and the center point of the second view camera are transmitted.

The extracting of the multiview camera parameter information may comprise determining whether the multiview camera parameter information is included as metadata of the received stereoscopic data stream.

When the received stereoscopic image data stream is recorded in an international standardization organization (ISO) base media file format, the extracting of the multiview camera parameter information may comprise extracting the multiview camera parameter information from the ISO base media file format.

When the ISO base media file format includes a moov box, an mdat box, and a meta box, the extracting of the multiview camera parameter information may comprise extracting the multiview camera parameter information from at least one of a lower box of the moov box, a lower box of a trak box that is a lower box of the moov box, a lower box of a trak box, and a lower box of a meta box that is a lower box of the trak box.

According to another aspect of the present invention, there is provided an apparatus for receiving multiview camera parameters for a stereoscopic image, the apparatus comprising: a multiview camera parameter information extracting unit extracting multiview camera parameter information for a predetermined data section from a received stereoscopic image data stream; a matrix information extracting unit extracting matrix information including at least one of translation matrix information and rotation matrix information for the predetermined data section from the multiview camera parameter information; and a multiview camera coordinate system restoring unit restoring coordinate systems of multiview cameras by using the matrix information.

According to another aspect of the present invention, there is provided a method of transmitting multiview camera parameters for a stereoscopic image, the method comprising: setting coordinate systems of a first view camera and a second view camera for a predetermined data section for the stereoscopic image; determining matrix information including at least one of a translation matrix and a rotation matrix in the predetermined data section from the set coordinate systems; and setting multiview camera parameter information for the predetermined data section by using the determined matrix information.

The setting of the multiview camera parameter information may comprise setting at least one of a camera focal length and additional parameter information for the predetermined data section, wherein the additional parameter information comprises at least one of a center point of each camera and an aspect ratio of an image for the predetermined data section, wherein the amount of the additional parameter information transmitted is determined according to the degree of importance of the additional parameter information, and the degree of importance of the additional parameter information has: a first level at which the additional parameter information is not transmitted; a second level at which only the aspect ratio of the image is transmitted; a third level at which the aspect ratio of the image and the center point of the first view camera are transmitted, and the center point of the second view camera is identical with the center point of the first view camera; and a fourth level at which the aspect ratio of the image, the center point of the first view camera, and the center point of the second view camera are transmitted.

The setting of the coordinate systems of the first view camera and the second view camera may comprise locating an origin of the coordinate system of the second view camera on one of coordinate axes of the coordinate system of the first view camera, wherein the determining of the matrix information comprises: determining as a parameter of the translation matrix a translation value of an origin of the coordinate system of the second view camera with respect to one of coordinate axes of the coordinate system of the first view camera; determining whether the rotation matrix information is to be set according to an arrangement of the first view camera and the second view camera, and determining as a parameter of the rotation matrix any one of three axis rotation angle information of the second view camera with respect to the first view camera based on the first view camera and one axis rotation angle information of the first view camera and the second view camera which are symmetric about a predetermined axis.

The determining of the matrix information may comprise: determining as a parameter of the translation matrix information a translation value of an origin of the coordinate system of the second view camera based on the coordinate system of the first view camera; and determining whether the rotation matrix information is to be set according to an arrangement of the first view camera and the second view camera, and determining as a parameter of the rotation matrix any one of three axis rotation angle information of the second view camera with respect to the first view camera based on the first view camera, and one axis rotation angle of the first view camera and the second view camera which are symmetric about a predetermined axis.

The method may further comprise: receiving stereoscopic image data; and recording the set multiview camera parameter information as metadata of the received stereoscopic image data.

When the stereoscopic image data is recorded in an international standardization organization (ISO) base media file format, the recording of the set multiview camera parameter information may comprise recording the multiview camera parameter information in the ISO base media file format.

When the ISO base media file format includes a moov box, an mdat box, and a meta box, the recording of the multiview camera parameter information may comprise recording the multiview camera parameter information in at least one of a lower box of the meta box, a lower box of the moov box, a lower box of a trak box that is a lower box of the moov box, a lower box of a trak box, and a lower box of the meta box that is a lower box of the trak box.

According to another aspect of the present invention, there is provided an apparatus for transmitting multiview camera parameters for a stereoscopic image, the apparatus comprising: a multiview camera coordinate system setting unit setting coordinate systems of a first view camera and a second view camera in a predetermined data section of the stereoscopic image; a matrix information determining unit determining matrix information including at least one of a translation matrix and a rotation matrix for the predetermined data section by using the set coordinate systems; and a multiview camera parameter information setting unit setting multiview camera parameter information for the predetermined data section by using the determined matrix information.

According to another aspect of the present invention, there is provided a computer-readable recording medium having embodied thereon a program for executing the method of receiving the multiview camera parameters for the stereoscopic image.

According to another aspect of the present invention, there is provided a computer-readable recording medium having embodied thereon a program for executing the method of transmitting the multiview camera parameters for the stereoscopic image.

BRIEF DESCRIPTION OF THE DRAWINGS

The above and other features of the present invention will become more apparent by describing in detail exemplary embodiments thereof with reference to the attached drawings in which:

FIG. 5B illustrates parameters of matrix information for a stereoscopic camera system according to an embodiment of the present invention;

FIG. 5C illustrates parameters of matrix information of a general multiview camera system according to an embodiment of the present invention.

FIG. 7 illustrates a format of multiview camera parameters for representing camera parameters according to an embodiment of the present invention;

FIG. 9A illustrates a method of representing camera parameters of a multiview camera system providing a stereoscopic effect in an ISO base file format according to an embodiment of the present invention;

FIG. 9B illustrates a method of representing camera parameters of a general multiview camera system in an ISO base file format according to an embodiment of the present invention;

FIG. 9C illustrates a method of representing camera parameters of a general multiview camera system in an ISO base file format according to another embodiment of the present invention;

FIG. 13 is a block diagram of a stereoscopic image restoration/reproduction system using a stereoscopic image restoration method, according to an embodiment of the present invention.

DETAILED DESCRIPTION OF THE INVENTION

The present invention will now be described more fully with reference to the accompanying drawings, in which exemplary embodiments of the invention are shown.

Figure 1:
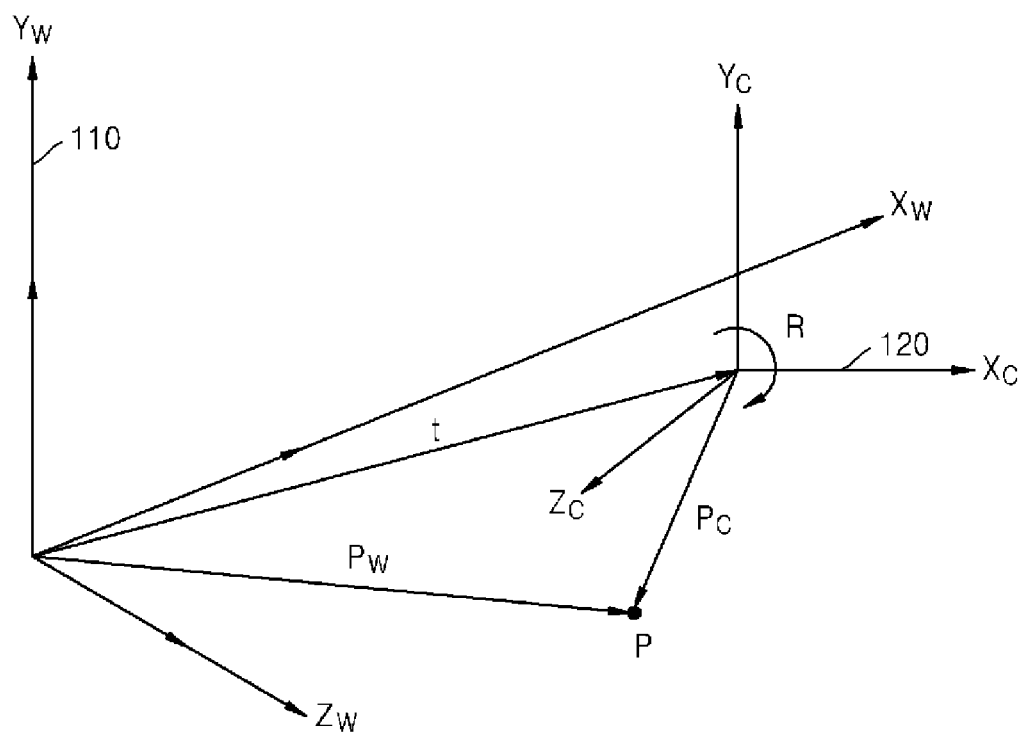
FIG. 1 illustrates a relationship between a world coordinate system and a camera coordinate system.
Figure 2A:
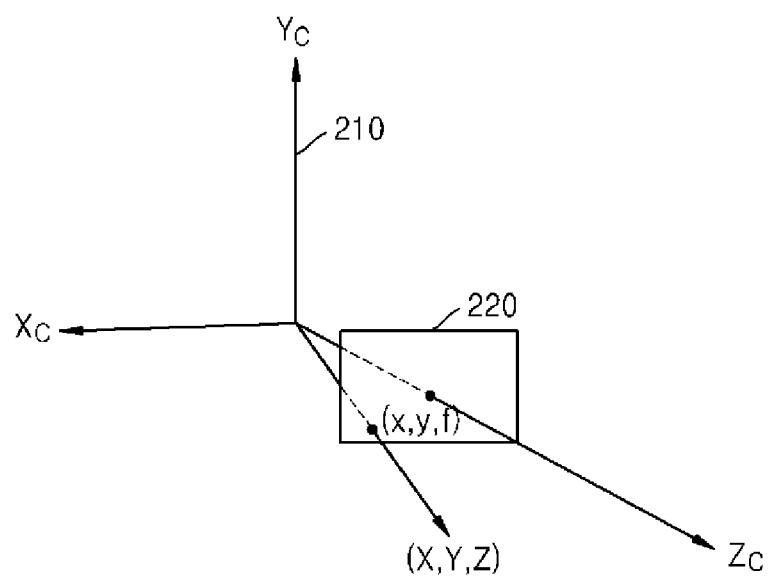
FIG. 2A illustrates a relationship between a camera coordinate system and an image coordinate system.
Figure 2B:
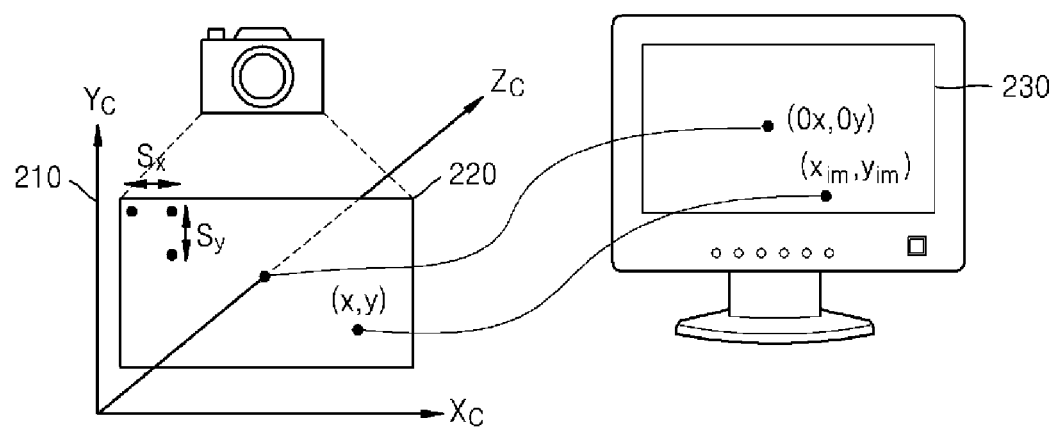
FIG. 2B illustrates a relationship between a camera coordinate system and an arbitrary point in an image.
Figure 3:
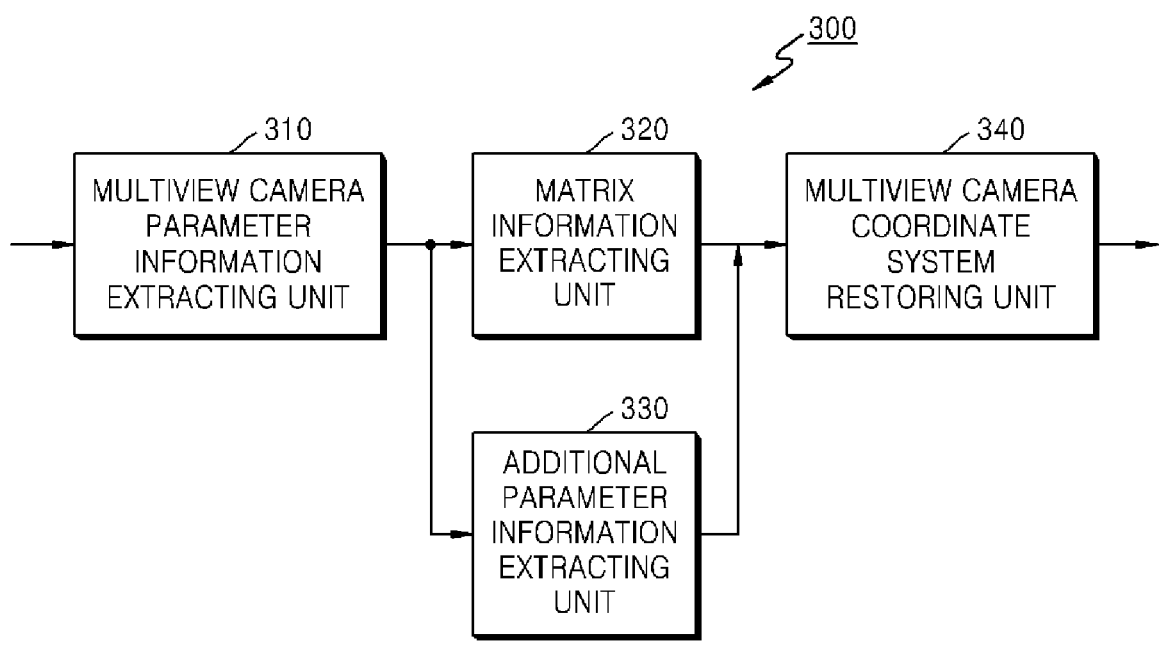
FIG. 3 is a block diagram of an apparatus for receiving multiview camera parameters for a stereoscopic image according to an embodiment of the present invention.

FIG. 3 is a block diagram of an apparatus 300 for receiving multiview camera parameters for a stereoscopic image according to an embodiment of the present invention.

Referring to FIG. 3, the apparatus 300 includes a multiview camera parameter information extracting unit 310, a matrix information extracting unit 320, an additional parameter information extracting unit 330, and a multiview camera coordinate system restoring unit 340.

The multiview camera parameter information extracting unit 310 extracts multiview camera parameter information for a predetermined data section from a received stereoscopic image data stream, and outputs the multiview camera parameter information to the matrix information extracting unit 320 and the additional parameter information extracting unit 330.

Various pieces of parameter information may be set for each predetermined data section. The predetermined data section is a data section including at least one of a variety of stereoscopic image data units such as a frame, a group of pictures (GOP), and a field. The predetermined data section may vary over time.

For example, the predetermined data section may be a data section including at least one frame. If a stereoscopic image is comprised of one data section including all frames, the same camera parameter information may be applied to all the frames of the stereoscopic image. However, if a stereoscopic image is comprised of a plurality of data sections each including at least one frame, different pieces of camera parameter information may be applied to the frames in the data sections.

The multiview camera parameter information extracting unit 310 determines whether the multiview camera parameter information is included as metadata of the received stereoscopic image data stream.

When the stereoscopic image data is recorded in an international standardization organization (ISO) base media file format, the multiview camera parameter information extracting unit 310 extracts the multiview camera parameter information from the ISO base media file format.

When the stereoscopic image data is recorded in the ISO base media file format, the ISO base medial file format may consist of a moov box, an mdat box, and a meta box. The multiview camera parameter information may be extracted from at least one of a lower box of the moov box, a lower box of a trak box that is a lower box of the moov box, a lower box of a trak box, and a lower box of the meta box that is a lower box of the trak box.

The matrix information extracting unit 320 extracts matrix information including at least one of translation matrix information and rotation matrix information of multiview camera coordinate systems for the predetermined data section from the multiview camera parameter information input from the multiview camera parameter information extracting unit 310, and outputs the extracted matrix information to the multiview camera coordinate system restoring unit 340.

The matrix information extracting unit 320 includes a translation matrix information extracting unit that extracts a parameter for the translation matrix information. The parameter of the translation matrix information is a translation value of an origin of a coordinate system of a second view camera with respect to one of coordinate axes of a coordinate system of a first view camera. The camera coordinate system restoring unit 340 locates the origin of the coordinate system of the second view camera on the one of coordinate axes of the coordinate system of the first view camera.

The parameter of the translation matrix information is the translation value of the origin of the coordinate system of the second view camera based on the coordinate system of the first view camera.

Methods of setting the translation matrix information will be explained later with reference to FIGS. 5A and 5B.

The matrix information extracting unit 320 determines whether the rotation matrix information is to be extracted according to an arrangement of the first view camera and the second view camera. A parameter of the rotation matrix information is rotation angle information of the second view camera with respect to the first view camera based on the first view camera.

That is, the parameter of the rotation matrix information is information on a rotation angle of the coordinate system of the second view camera with respect to the coordinate system of the first view camera. Therefore, information on the relationship can be expressed by transmitting only the relative values without transmitting camera parameters of the first view camera.

The additional parameter information extracting unit 330 extracts at least one of a focal length and additional parameter information for the predetermined data section from the multiview camera parameter information input from the multiview camera parameter information extracting unit 310, and outputs the extracted information to the camera coordinate system restoring unit 340. The additional parameter information includes at least one of a center point of each camera and an aspect ratio of an image in the predetermined data section.

The amount of the additional parameter information transmitted is determined according to the degree of importance of the additional parameter information. The degree of importance of the additional parameter information includes a first level at which the additional parameter information is not transmitted, a second level at which only the aspect ratio of the image is transmitted, a third level at which the aspect ratio of the image and the center point of the first view camera are transmitted and the center point of the second view camera is identical with the center point of the first view camera, and a fourth level at which the aspect ratio of the image, the center point of the first view camera, and the center point of the second view camera are transmitted.

The multiview camera coordinate system restoring unit 340 receives the extracted parameter information from the matrix information extracting unit 320 and the additional parameter information extracting unit 330, and restores the coordinate systems of the first and second view cameras by using the translation matrix information, the rotation matrix information, and the additional parameter information.

The multiview camera coordinate system restoring unit 340 locates the origin of the second view camera on one of the coordinate axes of the coordinate system of the first view camera.

A method of setting coordinate systems of the first view camera and the second view camera which is performed by the multiview camera coordinate system restoring unit 340 will be explained in detail with reference to FIGS. 5A and 5B.

Figure 4:
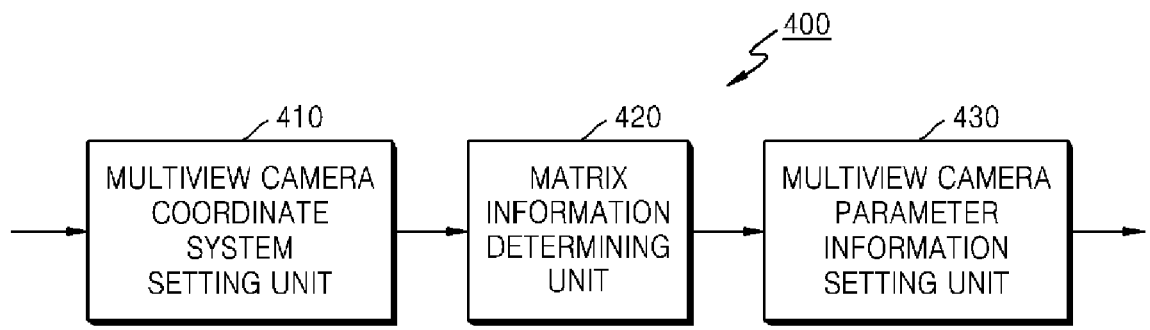
FIG. 4 is a block diagram of an apparatus for transmitting multiview camera parameters for a stereoscopic image according to an embodiment of the present invention.

FIG. 4 is a block diagram of an apparatus 400 for transmitting multiview camera parameters for a stereoscopic image according to an embodiment of the present invention.

Referring to FIG. 4, the apparatus 400 includes a multiview camera coordinate system setting unit 410, a matrix information determining unit 420, and a multiview camera parameter information setting unit 430.

The multiview camera coordinate system setting unit 410 sets coordinate systems of a first view camera and a second view camera for a predetermined data section including at least one frame of the stereoscopic image.

The multiview camera coordinate system setting unit 410 locates an origin of the coordinate system of the second view camera on one of coordinate axes of the coordinate system of the first view camera.

The matrix information determining unit 420 determines matrix information including at least one of a translation matrix and a rotation matrix for the predetermined data section by using the coordinate systems set by the multiview camera coordinate system setting unit 410, and outputs the determined matrix information to the multiview camera parameter information setting unit 430.

The matrix information determining unit 420 determines as a parameter of the translation matrix a translation value of the origin of the coordinate system of the second view camera with respect to the coordinate system of the first view camera. The matrix information determining unit 420 uses as a parameter of the rotation matrix rotation angle information of the second view camera with respect to the first view camera.

The multiview camera parameter information setting unit 430 sets multiview camera parameter information in the predetermined data section by using the matrix information determined by the matrix information determining unit 420.

The multiview camera parameter information setting unit 430 includes an additional parameter information determining unit (not shown) that sets at least one of a focal length and additional parameter information for the predetermined data section. The additional parameter information includes at least one of a center point of each camera and an aspect ratio of an image for the predetermined data section. The amount of additional parameter information transmitted is determined according to the degree of importance of the additional parameter information. The degree of importance of the additional parameter information has the same four levels as described above with reference to the additional parameter information extracted by the apparatus 300.

The apparatus 400 includes an input unit (not shown) receiving stereoscopic image data, and a multiview camera parameter information recording unit (not shown) recording the set multiview camera parameter information as meta data of the stereoscopic image data.

When the stereoscopic image data is recorded in an ISO base media file format, the multiview camera parameter information recording unit records the multiview camera parameter information in the ISO base media file format.

When the stereoscopic image data is recorded in the ISO base media file format, the ISO base media file format may include a moov box, an mdat box, and a meta box. The multiview camera parameter information may be recorded in at least one of a lower box of the meta box, a lower box of the moov box, a lower box of a trak box that is a lower box of the moov box, and a lower box of the meta box that is a lower box of the trak box.

The present invention can represent camera parameters under conditions where there is a stereoscopic effect. In order for a three-dimensional (3D) display to provide a stereoscopic effect, a left view image and a right view image should have the same focal length because most of currently available 3D displays limit a viewing position to the center. Also, a left view camera and a right view camera should be aligned to share the same axis. If the two cameras are not aligned, the sizes of subjects in the left view image and the right view image may be fairly different from each other even though a parallel camera system is used. In this case, a stereoscopic image cannot be generated using the left view image and the right view image and recognized as a 3D images by viewers. The present invention provides methods of representing camera parameters both under general conditions and under special conditions where a stereoscopic effect is provided.

Figure 5A:
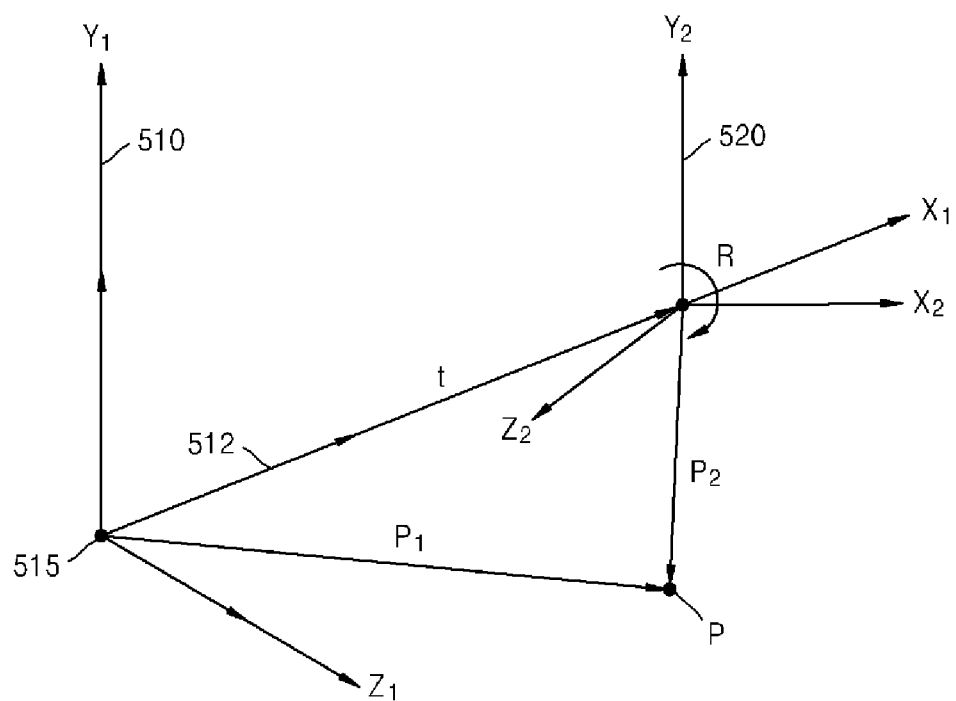
FIG. 5A illustrates a method of representing coordinate systems of multiview cameras providing a stereoscopic effect according to an embodiment of the present invention.

FIG. 5A illustrates a method of representing coordinate systems of multiview cameras providing a stereoscopic effect according to an embodiment of the present invention. The coordinate systems of the multiview cameras used in the multiview camera coordinate system restoring unit 340 and the multiview camera coordinate system setting unit 410 will now be explained in detail with reference to FIG. 5A.

In a first view coordinate system 510, an $X_1$ axis 512, a $Y_1$ axis, and a $Z_1$ axis orthogonally intersect one another at an origin 515.

Since human eyes whose visual axes are almost parallel are spaced by a predetermined distance, e.g., 65 mm, from each other, different view cameras should be aligned to share the same axis in order to provide a stereoscopic effect. Accordingly, in order to see a stereoscopic image, an origin 525 of a second view camera coordinate system 520 is located on the $X_1$ axis 512 of the first view camera coordinate system 510. That is, the origin 525 of the second view camera coordinate system 520 is located at $(t_x, 0, 0)$ which is spaced by $t_x$ from the origin 515 of the first view camera coordinate system 510.

Accordingly, a translation matrix between the first view camera coordinate system 510 and the second view camera coordinate system 520 becomes $(t_x, 0, 0)$. That is, a multiview camera system providing a stereoscopic effect using the method of FIG. 5A can determine a translation matrix by using only a translation value along one axis, without using translation values along all the X, Y, and Z axes.

In the case of a general multiview camera system without providing a stereoscopic effect, the origin 525 of the second view camera coordinate system 520 is not located on one of the coordinate axes of the first view coordinate system 510. Accordingly, translation values of the origin 525 of the second view camera coordinate system 520 along all the X, Y, and Z axes based on the first view camera coordinate system 510 are required as multiview camera parameter information.

Also, a parameter of a rotation matrix R is also required to express the translation value of the origin of the second view camera coordinate system 520 with respect to each of the coordinate axes of the first view camera coordinate system 510. The rotation matrix R requires a rotation angle $\alpha$ along the X axis, a rotation angle $\beta$ along the Y axis, and a rotation angle $\gamma$ along the Z axis.

FIG. 5B illustrates parameters of matrix information for a stereoscopic camera system according to an embodiment of the present invention.

The stereoscopic camera system includes a first view camera and a second view camera and can obtain a stereoscopic image.

Since an origin of a coordinate system of the second view camera is located on one of coordinate axes of a coordinate system of the first view camera as described above, a translation matrix is expressed as only one coordinate value, that is, $(t_x, 0, 0)$.

A rotation matrix is expressed as a relative value between the first view camera and the second view camera. In the case of the stereoscopic camera system providing a stereoscopic effect, since it is assumed that focal lengths are the same, a rotation angle value along a Y axis is varied whereas rotation angles along other axes are fixed. That is, while each of the first and second view cameras is fixed to an angle $\alpha$ along the X axis and to an angle $\gamma$ along the Z axis, the first view camera is rotated by an angle $-\beta/2$ along the Y axis and the second view camera is rotated by $\beta/2$ along the Y axis. Accordingly, the stereoscopic camera system providing the stereoscopic effect can express relative rotation information by using only a rotation angle along one axis.

FIG. 5C illustrates parameters of matrix information of a general multiview camera system according to an embodiment of the present invention.

Although a stereoscopic camera system can sufficiently represent camera parameters by using only relative values between cameras, since the multiview camera system includes two or more cameras in addition to a base view camera, there is a limitation in representing camera parameters by using only relative values. In a multiview moving picture, there is a base view. The base view can be independently decoded without estimating other views. A translation matrix and a rotation matrix of the multiview camera system are expressed by using this base view.

For example, a translation matrix is expressed as (0,0,0) in the case of the base view, and is expressed as relative values based on (0,0,0) in the case of other views. Since it is impossible to align multiview images, a rotation matrix R is required. The rotation matrix R is expressed as f(0,0,0)=I in the case of the base view, and is expressed as relative values based on f(0,0,0)=I in the case of other views.

Unlike the matrix information of the aforesaid stereoscopic camera system, the general multiview camera system without providing any stereoscopic effect expresses rotation information by using the rotation matrix.

If a stereoscopic camera system is extended to a multiview camera system, a first view is set as a base view and a second view is set as an additional view.

The apparatus 300 of FIG. 3 and the apparatus 400 of FIG. 4 may set coordinate systems by using a translation parameter $(t_X, t_Y, t_Z)$ along three axes and a rotation angle $(\alpha, \beta, \gamma)$ along three axes with reference to FIG. 5C.

Since the matrix information extracting unit 320 determines whether rotation matrix information is to be extracted according to an arrangement of the first view camera and the second view camera, the rotation matrix information is set by the arrangement of the multiview cameras only when necessary. For example, when the first view camera and the second view camera are arranged convergently, the rotation matrix information is necessary, but when they are arranged in parallel, the rotation matrix information is not necessary.

Figures 6A, 6B:
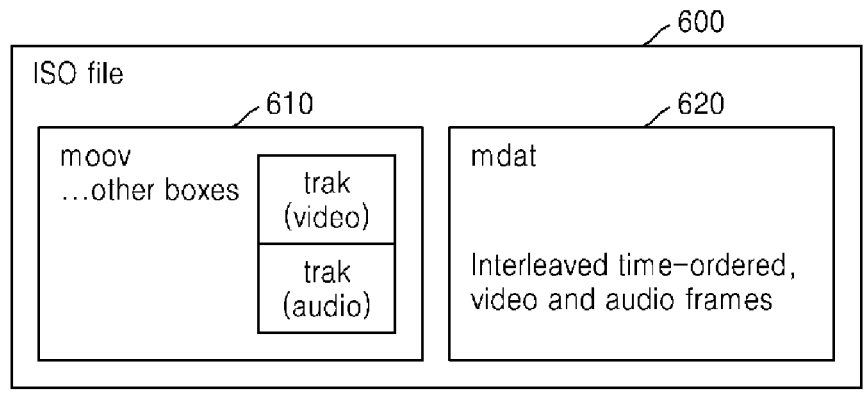
FIG. 6A illustrates an international standardization organization (ISO) base file format.
FIG. 6B illustrates a box list of the ISO base file format of FIG. 6A according to an embodiment of the present invention.

FIG. 6A illustrates an international standardization organization (ISO) base file format according to an embodiment of the present invention.

A basic structure of the ISO base media file format will now be explained with reference to FIG. 6A. An ISO file box 600 includes a moov box 610 and an mdat box 620.

The moov box 610 contains basic header information of video trak or audio trak information, and the mdat box 620 contains actual video data or audio data. The mdat box 620 contains interleaved time-ordered video or audio frames.

FIG. 6B illustrates a box list of the ISO base file format of FIG. 6A according to an embodiment of the present invention.

An ftyp box 630 indicates a file type and compatibility and contains information on a major brand 'major_brand' of a corresponding file. The ftyp box 630 sets the file type, the compatibility, and the major brand 'major_brand' to 'ssav' in order to indicate that the corresponding file is a stereoscopic image file. Here, ssav is the abbreviation for stereoscopic audio-video (AV).

The moov box 610 is a container for all metadata of timed resources. As described above with reference to FIG. 6A, the moov box 610 contains header information or metadata for actual media data contained in the mdat box 620.

The mdat box 620 is a container for media data as described above with reference to FIG. 6A.

A meta box 640 is a container for metadata other than that of the moov box 610. A three dimensional camera parameter (tdcp) box 650 which is a container for multiview camera parameter information for a stereoscopic image is a lower box of the meta box 640.

A trak box, which is a lower box of the moov box 610, is a container for an individual track or stream of main AV data or auxiliary data. The tdcp box 650, which is the container for the multiview camera parameter information for the stereoscopic image, is a lower box of another meta box that is a lower box of the trak box.

Although not shown in FIG. 6B, a container for multiview camera parameter information for a stereoscopic image may be located in at least one of a lower box of the meta box 640, a lower box of the moov box 610, a lower box of the trak box that is a lower box of the moov box 610, a lower box of the trak box, and a lower box of the meta box 640 that is a lower box of the trak box.

Accordingly, the multiview camera parameter information extracting unit 310 extracts disparity vector information from multiview camera parameters extracted from the tdcp box 650 of FIG. 6B. The apparatus 400 records the multiview camera parameters in the tdcp box 650 of the heard information of the ISO base media file format.

FIG. 7 illustrates a format of multiview camera parameters for representing camera parameters according to an embodiment of the present invention.

'3DCamParams( )' indicates stereoscopic multiview camera parameters.

'Is_CamParams' is a variable indicating whether the stereoscopic multiview camera parameters exist. When 'Is_CamParams' is 0, camera parameters may not exist, and when 'Is_CamParams' is 1, camera parameters may exist.

'CamArrange' indicates an overall arrangement of a stereoscopic multiview camera system. The arrangement of the stereoscopic multiview camera system will be explained later with reference to FIG. 8A.

'baseline_distance' is a parameter of a translation matrix. Since positions of a first view camera coordinate system and a second view coordinate system are adjusted, only one coordinate value on one of coordinate axes instead of all coordinate values is transmitted.

'focal_length' is a focal length of each camera. Although a multiview camera system for a stereoscopic image includes a plurality of cameras and the cameras may have slightly different focal lengths, the focal lengths should be the same basically in order to provide a stereoscopic effect. Accordingly, it is assumed that all the cameras have the same focal length. Accordingly, 'focal_length' is expressed as one value.

'rotation[3]' indicates rotation angles of the rotation matrix along three axes. When the cameras are arranged in parallel, 'rotation[3]' is no longer necessary. When the cameras are arranged convergently, 'rotation[3]' is transmitted or stored.

'num_of_AdditionalParams' indicates the number of pieces of additional parameter information which is an additional parameter.

'AdditionalParams' indicates various additional parameter information for the multiview cameras for the stereoscopic image. An aspect ratio of an image and a center point of each camera are used as the additional parameter information.

The degree of importance of the additional parameter information has four levels such that only necessary parameters are transmitted or stored according to the degree of importance using 'num_of_AdditionalParams'. In the additional parameter information, the degree of importance of the aspect ratio of the image is the highest, the degree of importance of the center point $(O_X, O_Y)$ of the first view camera is the second, and the degree of importance of the center point $(O_X, O_Y)$ of the second view camera is the lowest.

Based on the degree of importance of the additional parameter information, 'num_of_AdditionalParams' is set to 0, 1, 3, and 5, and the additional parameter information is not transmitted in the case of 0, only the aspect ratio of the image is transmitted in the case of 1, the aspect ratio of the image and the center point of the first view camera are transmitted and the center point of the second view camera is assumed to be identical with the center point of the first view camera in the case of 3, and the aspect ratio of the image, the center point of the first view camera, and the center point of the second view camera are transmitted in the case of 5.

Figures 8A, 8B:
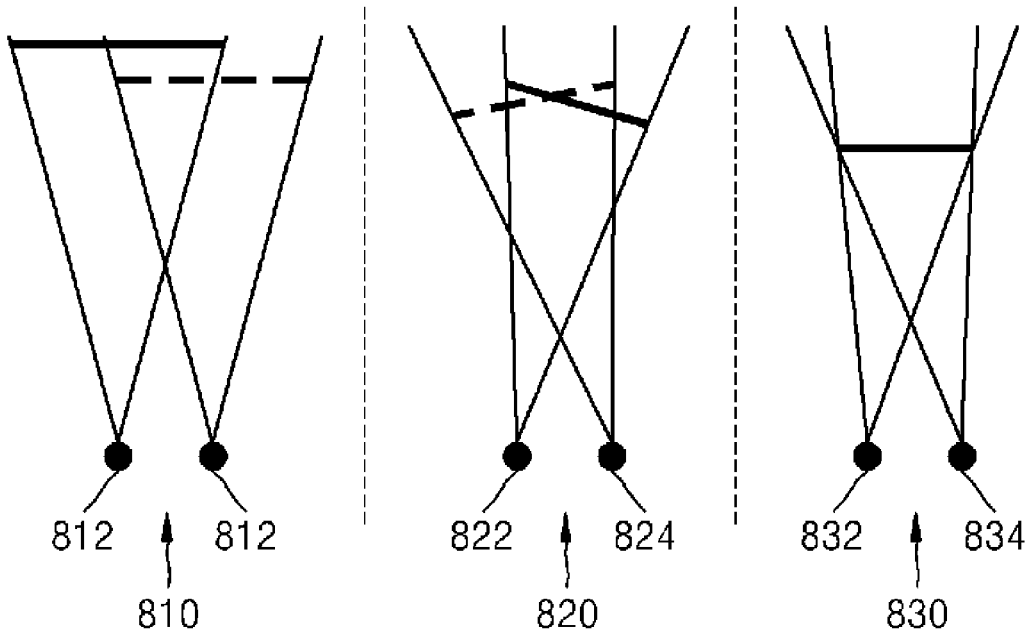
FIG. 8A illustrates various methods of arranging multiview cameras according to embodiments of the present invention.
FIG. 8B illustrates a method of representing camera parameters in the various methods of arranging the multiview cameras of FIG. 8A according to an embodiment of the present invention.

FIG. 8A illustrates various methods of arranging multiview cameras according to embodiments of the present invention.

A left picture 810 shows that a first view camera 812 and a second view camera 814 are arranged in a parallel manner. A central picture 820 shows that a first view camera 822 and a second view camera 824 are arranged in a convergent manner. A right picture 830 shows that a first view camera 832 and a second view camera 834 are arranged in a parallel and convergent manner.

FIG. 8B illustrates a method of representing camera parameters in the various methods of arranging the multiview cameras of FIG. 8B according to an embodiment of the present invention.

The parameter 'CamArrange' of FIG. 7 is defined by the arrangement of the multiview cameras. When the multiview cameras are arranged in a parallel manner, 'CamArrange' is set to 0, when the multiview cameras are arranged in a convergent manner, 'CamArrange' is set to 1, and when the multiview cameras are arranged in a parallel and convergent manner, 'CamArrange' is set to 2. 'CamArrange' is set to 3 through 15 when the multiview cameras are arranged by a user.

FIG. 9A illustrates a method of representing camera parameters of a multiview camera system providing a stereoscopic effect in an ISO base file format according to an embodiment of the present invention.

In the syntax used to represent the camera parameters of FIG. 9A, the tdcp box 650 for the 3D multiview camera parameters is a lower box of the meta box 640 as shown in FIG. 6B. The 3D multiview camera parameters in the ISO base media file format are not mandatory, and the quantity of the 3D multiview camera parameters is 0 or 1. The same camera parameters 910 are defined for all frames.

Since the method of FIG. 9A represents the camera parameters of the multiview camera system providing the stereoscopic effect, a parameter of translation matrix information is defined as a translation value 'baseline_distance' 920 along one of coordinate axes. Each camera parameter is defined in the same way as described above with reference to FIG. 7.

FIG. 9B illustrates a method of representing camera parameters of a general multiview camera system in an ISO base file format according to an embodiment of the present invention.

Since the method of FIG. 9B represents camera parameters 930 of the general multiview camera system, a parameter of translation matrix information is defined as translation values 'translation[3]' 940 along three axes. Each camera parameter is defined in the same way as described above with reference to FIG. 7.

FIG. 9C illustrates a method of representing camera parameters of a general multiview camera system in an ISO base file format according to another embodiment of the present invention.

Since the camera parameters of FIG. 9C are variable along a time axis, camera parameters are individually set for every predetermined data section that is a frame section including at least one frame. Each camera parameter is defined in the same way as described above with reference to FIG. 7.

Camera parameters 960 are defined for each data section using a loop statement 'for(j=0;j<count;j++)' 950. That is, since identification information 'ES_ID' 970 of a current basic stream, offset frame position information 'offset' 972 of the current basic stream, and the number of frames 'length' 974 in a current data section are defined for each frame, frame information in the current basic stream and the current data section is set, and an individual camera parameter 980 is set for each data section.

Since the method of FIG. 9C represents the camera parameters of the general multiview camera system, and a parameter of translation matrix information is defined as translation values 'translation[3]' 990 along three axes.

Figure 10:
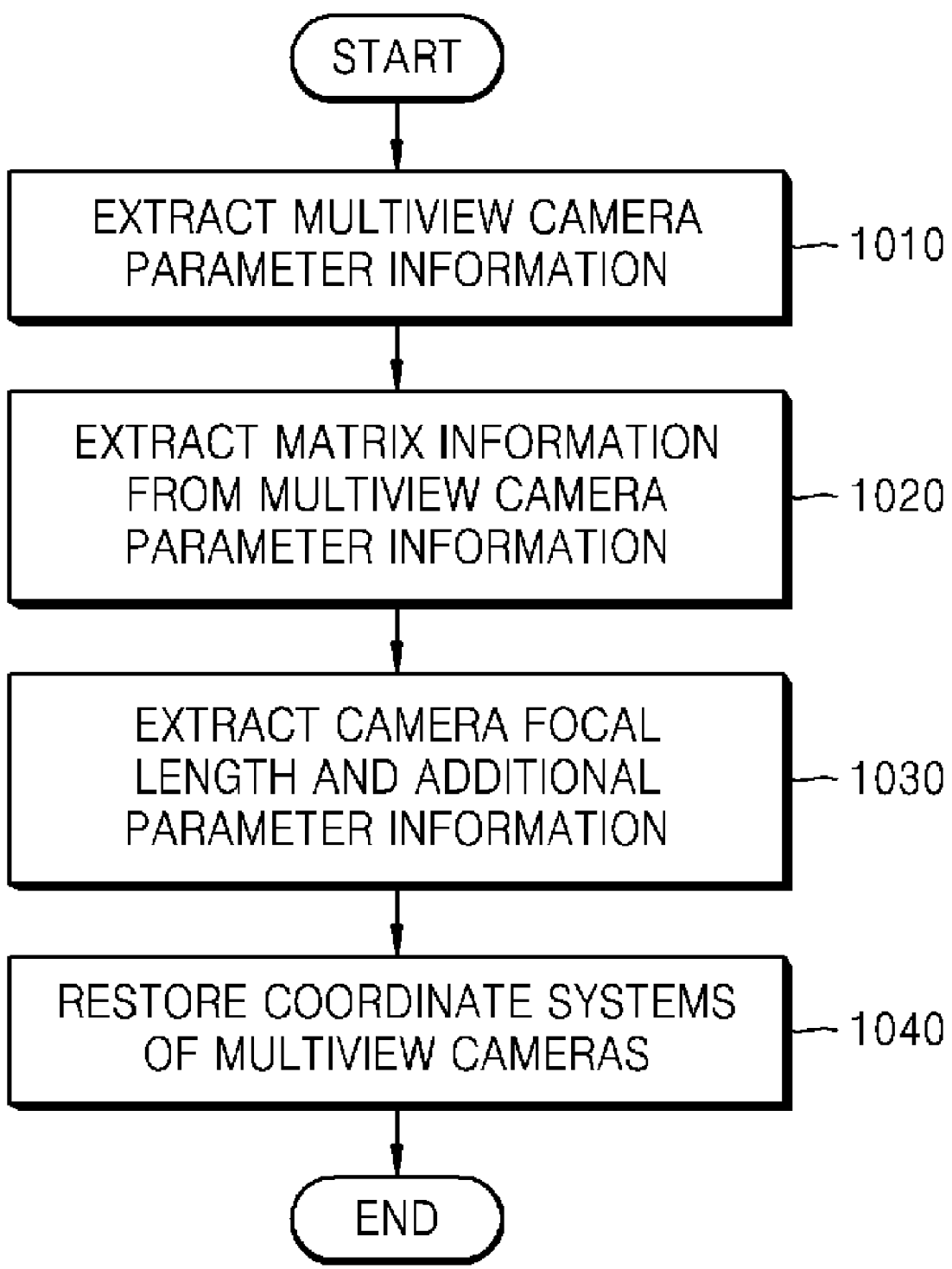
FIG. 10 is a flowchart illustrating a method of receiving multiview camera parameters for a stereoscopic image according to an embodiment of the present invention.

FIG. 10 is a flowchart illustrating a method of receiving multiview camera parameters for a stereoscopic image according to an embodiment of the present invention.

In operation 1010, multiview camera parameter information is extracted from a received stereoscopic image data stream.

The multiview camera parameter information is extracted from header information or metadata of the stereoscopic image data stream.

In operation 1020, matrix information including at least one of a translation matrix and rotation matrix information of coordinate systems of multiview cameras is extracted from the multiview camera parameter information.

The translation matrix includes a coordinate value of the coordinate system of one view camera with respect to the coordinate system of the other view camera. The rotation matrix information includes one axis rotation angle information or three axis rotation angle information.

In operation 1030, a camera focal length and additional parameter information are extracted. The additional parameter information includes at least one of an aspect ratio of an image and a center point of each camera.

In the additional parameter information, the degree of importance of the aspect ratio of the image is the highest, the degree of importance of the center point of the first view camera is the second, and the degree of importance of the center point of the second view camera is the lowest.

In operation 1040, the coordinate systems of the multiview cameras are restored by using at least one of the matrix information, the additional parameter information, and the camera focal length.

The method of FIG. 10 locates an origin of the coordinate system of the second view camera on one of coordinate axes of the coordinate system of the first view camera.

Figure 11:
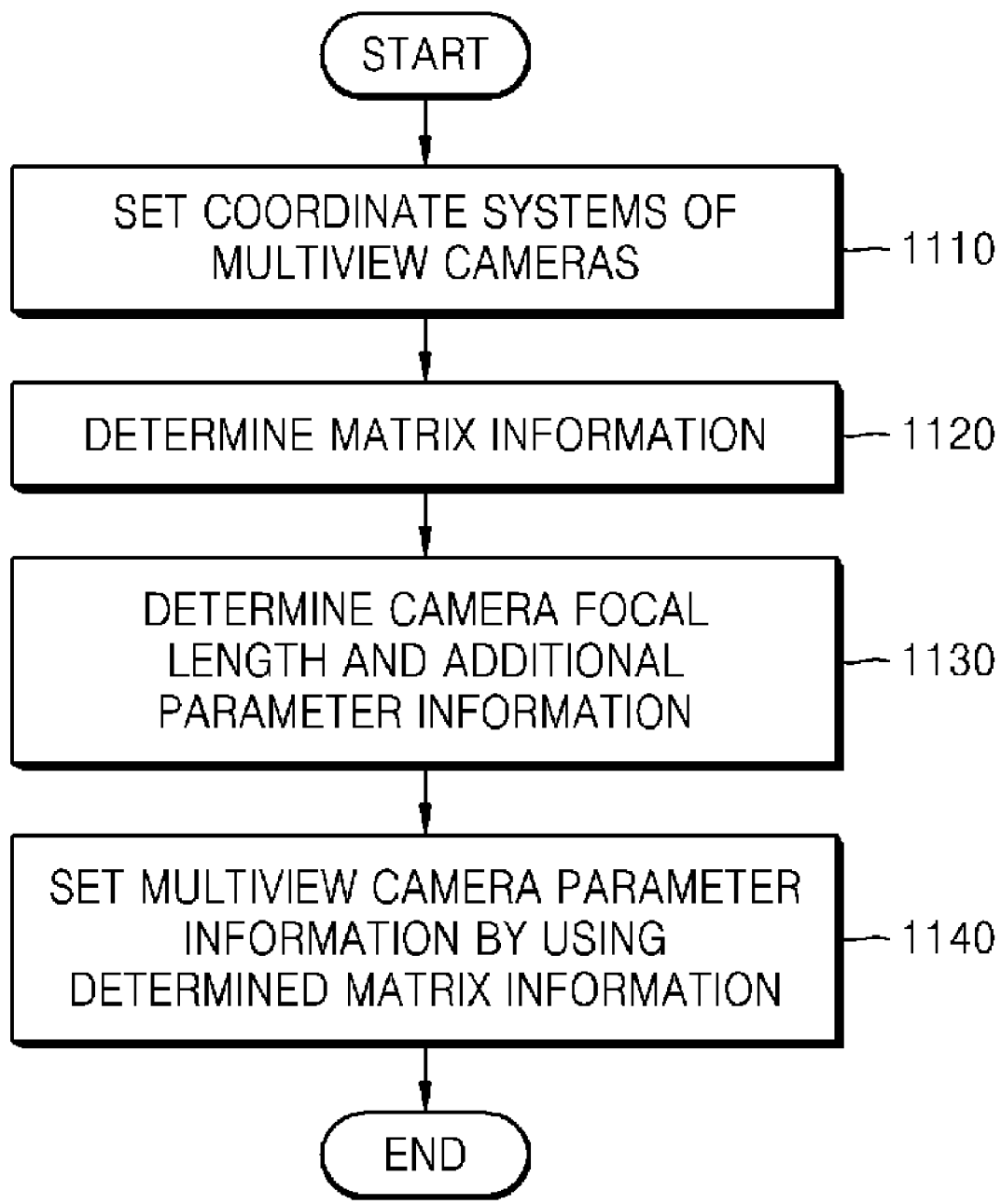
FIG. 11 is a flowchart illustrating a method of transmitting multiview camera parameters for a stereoscopic image according to an embodiment of the present invention.

FIG. 11 is a flowchart illustrating a method of transmitting multiview camera parameters for a stereoscopic image according to an embodiment of the present invention.

In operation 1110, coordinate systems of a first view camera and a second view camera of a multiview camera system for the stereoscopic image are set.

An origin of the coordinate system of the second view camera may be located on one of coordinate axes of the coordinate system of the first view camera.

In operation 1120, matrix information including at least one of a translation matrix and rotation matrix information is determined by using the set coordinate systems of the first and second view cameras of the multiview camera system.

The translation matrix includes a coordinate value of the coordinate system of one view camera with respect to the coordinate system of the other view camera, and the rotation matrix information includes one axis rotation angle information or three axis rotation angle information.

In operation 1130, a camera focal length and additional parameter information including at least one of an aspect ratio of an image and a center point of each camera in the multiview camera system are determined.

In the additional parameter information, the degree of importance of the aspect ratio of the image is the highest, the degree of importance of the center point of the first view camera is the second, and the degree of importance of the center point of the second view camera is the lowest.

In operation 1140, 3D multiview camera parameter information is set by using at least one of the determined matrix information, the additional parameter information, and the camera focal length.

The 3D multiview camera parameter information, such as the matrix information and the additional parameter information, is included in header information or metadata of the stereoscopic image data stream.

Figure 12:
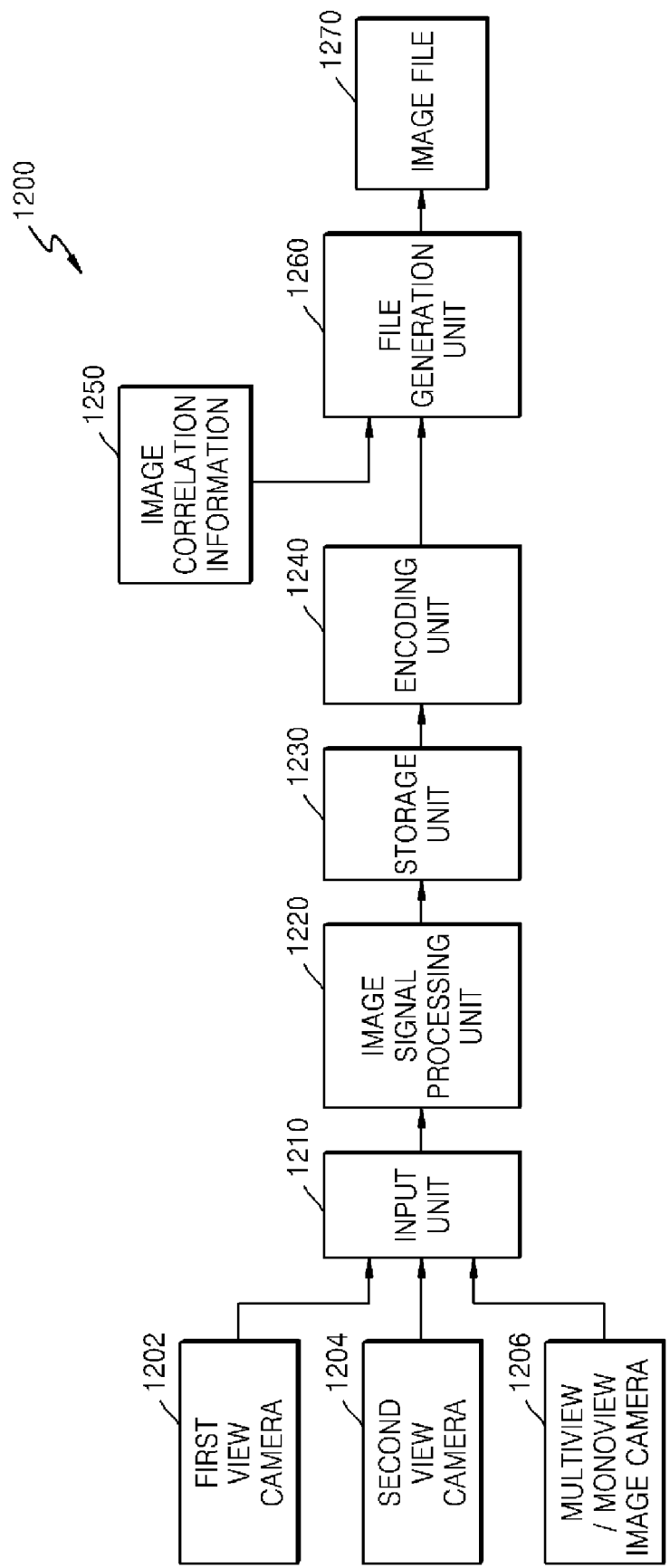
FIG. 12 is a block diagram of a stereoscopic image file generation system using a stereoscopic image datastream generation method, according to an embodiment of the present invention.

FIG. 12 is a block diagram of a stereoscopic image file generation system 1200 using a stereoscopic image datastream generation method, according to an embodiment of the present invention.

Referring to FIG. 12, the stereoscopic image file generation system 1200 includes a first view camera 1202, a second view camera 1204, a multiview/monoview image camera 1206, an input unit 1210, an image signal processing unit 1220, a storage unit 1230, an encoding unit 1240, and a file generation unit 1260.

The first and second view cameras 1202 and 1204 photograph a predetermined subject at first and second views so as to output different first and second view images, respectively. If a monoview image is also captured by the stereoscopic image file generation system 1200, a monoscopic image is output from the multiview/monoview image camera 1206. An image output from each of the first and second view cameras 1202 and 1204 and the multiview/monoview image camera 1206 is input to the input unit 1210.

The image input to the input unit 1210 is pre-processed by the image signal processing unit 1220. For example, external image values, which are analog values, are converted into digital values. Here, the external image values mean components of light and colors which are recognized by a sensor of a charge-coupled device (CCD) type or a complementary metal-oxide semiconductor (CMOS) type.

The storage unit 1230 stores image data of the pre-processed image and provides the image data to the encoding unit 1240. Although the storage unit 1230 is separately illustrated, the stereoscopic image file generation system 1200 may further include other storage elements for buffering between the other elements of the stereoscopic image file generation system 1200, which are not the storage unit 1230.

The encoding unit 1240 encodes the image data received from the storage unit 1230. If necessary, the encoding of the image data by the encoding unit 1240 may be omitted.

The file generation unit 1260 inserts image correlation information 1250 and the (encoded) image data received from the encoding unit 1240, into a predetermined file format so as to generate an image file 1270. The image correlation information 1250 may include reference information of a track box for representing correlations between images, and handler information for representing a media type of each image.

Also, the image correlation information 1250 may include two-dimensional (2D) image-related information and three-dimensional (3D) image-related information. The 3D image-related information represents a correlation between the first and second view images, and may include information on 2D/3D data sections, information on an arrangement method of the first and second view images, information on an image file type, a camera parameter, display information, and information on a disparity.

According to an embodiment of the present invention, the file generation unit 1260 may store the image data and the image correlation information 1250 respectively in a media data region and a header region of the image file 1270. If the image file 1270 is an ISO-based media file format, the image data may be stored in the form of an elementary stream, in an mdat box, and the image correlation information 1250 may be stored in a trak box or any sub-level box of the trak box.

The image file 1270 is input or transmitted to a 3D image file reproduction apparatus.

FIG. 13 is a block diagram of a stereoscopic image restoration/reproduction system 1300 using a stereoscopic image restoration method, according to an embodiment of the present invention.

Referring to FIG. 13, the stereoscopic image restoration/reproduction system 1300 includes a file parsing unit 1320, a decoding unit 1330, a storage unit 1340, a reproduction unit 1350, and a display unit 1360.

The file parsing unit 1320 parses a received image file 1310. After information stored in each of a ftyp box, a moov box, a trak box, and a meta box is analyzed, image data stored in an mdat box may be extracted. First view image data 1322, second view image data 1324, and multiview/monoview image data 1326 may be extracted as the image data. By parsing the image file 1310, image data-related information 1328 may also be extracted. The image data-related information 1328 may include correlation information between images, such as trak reference information regarding related tracks.

The decoding unit 1330 receives and decodes the image data including the first view image data 1322, the second view image data 1324, and the multiview/monoview image data 1326 which are extracted from the image file 1310. The decoding is performed only if the image data in the image file 1310 has been encoded. The storage unit 1340 receives and stores (decoded) image data 1335 that is output from the decoding unit 1330, and the extracted image data-related information 1328 that is extracted by the file parsing unit 1320.

The reproduction unit 1350 receives image reproduction-related information 1348 and image data 1345 to be reproduced, from the storage unit 1340 so as to reproduce an image. The image reproduction-related information 1348 is information required to reproduce the image from among the image data-related information 1328, and includes image correlation information.

The reproduction unit 1350 may reproduce the image data 1345 in a 2D or 3D image reproduction method, by using the image reproduction-related information 1348. For example, the reproduction unit 1350 may combine and reproduce correlated stereoscopic images by referring to image data identification information. Also, the reproduction unit 1350 may reproduce the correlated stereoscopic images and a monoscopic image together, by referring to the image data identification information and 2D/3D data section information.

The display unit 1360 may display the image reproduced by the reproduction unit 1350, on a screen. The display unit 1360 may be a barrier liquid crystal display (LCD). A monoscopic image may be displayed when the barrier LCD is turned off, and each view image of a stereoscopic image may be displayed when the barrier LCD is turned on.

The present invention may be embodied in a general purpose digital computer by running a program from a computer-readable medium. Examples of the computer-readable medium include storage media such as magnetic storage media (e.g., read only memories (ROMs), floppy discs, or hard discs), optically readable media (e.g., compact disk-read only memories (CD-ROMs), or digital versatile disks (DVDs)). Other storage media may include carrier waves (e.g., transmissions over the Internet).

As described above, since an origin of a coordinate system of a second view camera is located on one of coordinate axes of a coordinate system of a first view camera, the method and apparatus for receiving multiview camera parameters for a stereoscopic image and the method and apparatus for transmitting multiview camera parameters for a stereoscopic image according to the present invention can represent a camera system for a stereoscopic image by using a smaller number of camera parameters.

Furthermore, since the camera parameters are included in header information or metadata of a stereoscopic image data stream, the method and apparatus for receiving or transmitting the multiview camera parameters of the stereoscopic image according to the present invention can be applied to a process for a viewer's low fatigue, a process using an Epipolar line constraint, and a rectification process, thereby improving the quality of the stereoscopic image.

Moreover, since camera parameter information is variable along a time axis, the camera parameter information is individually set for each predetermine data section, thereby making it possible to more accurately represent the stereoscopic image.

In addition, the method and apparatus for receiving or transmitting the multiview camera parameters for the stereoscopic image according to the present invention can be applied to various fields using a stereoscopic image such as virtual image generation, intermediate image generation, and stereoscopic image display as well as compression/transmission.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of receiving multiview camera parameters for a stereoscopic image, the method comprising:
   extracting multiview camera parameter information for a predetermined data section from a received stereoscopic image data stream;
   extracting matrix information including at least one of translation matrix information and rotation matrix information for the predetermined data section from the multiview camera parameter information; and
   restoring coordinate systems of multiview cameras by using the extracted matrix information,
   wherein the stereoscopic image data stream comprises a plurality of data sections, the plurality of data sections include a plurality of partial data respectively into which the stereoscopic image data is temporally divided, and the camera parameter information is individually set for each of the plurality of data sections.

2. The method of claim 1, wherein the extracting of the matrix information comprises extracting at least one of a camera focal length and additional parameter information for the predetermined data section,
   wherein the additional parameter information includes at least one of a center point of each camera and an aspect ratio of an image for the predetermined data section.

3. The method of claim 1, wherein the restoring of the coordinate systems of a first and a second view camera comprises locating an origin of the coordinate system of the second view camera on one of coordinate axes of the coordinate system of the first view camera,
   wherein the extracting of the matrix information comprises determining as a parameter of the translation matrix information a translation value of the origin of the coordinate system of the second view camera with respect to one of coordinate axes of the coordinate system of the first view camera.

4. The method of claim 1, wherein the extracting of the matrix information comprises determining as a parameter of the translation matrix information a translation value of an origin of the coordinate system of the second view camera based on the coordinate system of the first view camera.

5. The method of claim 1, wherein the extracting of the matrix information comprises determining whether the rotation matrix information is to be extracted according to an arrangement of the first view camera and the second view camera,
   wherein a parameter of the rotation matrix information is any one of:
      three axis rotation angle information of the second view camera with respect to the first view camera based on the first view camera; and
      rotation angle information of the first view camera and the second view camera which are symmetric about a predetermined axis.

6. The method of claim 2, wherein an amount of the additional parameter information transmitted is determined according to a degree of importance of the additional parameter information, and the degree of importance of the additional parameter information includes:
   a first level at which the additional parameter information is not transmitted;
   a second level at which only the aspect ratio of the image is transmitted;
   a third level at which the aspect ratio of the image and the center point of the first view camera are transmitted, and the center point of the second view camera is identical with the center point of the first view camera; and
   a fourth level at which the aspect ratio of the image, the center point of the first view camera, and the center point of the second view camera are transmitted.

7. The method of claim 1, wherein the extracting of the multiview camera parameter information comprises determining whether the multiview camera parameter information is included as metadata of the received stereoscopic data stream.

8. The method of claim 1, wherein, if the received stereoscopic image data stream is recorded in an international standardization organization (ISO) base media file format, the extracting of the multiview camera parameter information comprises extracting the multiview camera parameter information from the ISO base media file format.

9. The method of claim 8, wherein, if the ISO base media file format includes a moov box, an mdat box, and a meta box, the extracting of the multiview camera parameter information comprises extracting the multiview camera parameter information from at least one of a lower box of the moov box, a lower box of a trak box that is a lower box of the moov box, a lower box of a trak box, and a lower box of a meta box that is a lower box of the trak box.

10. An apparatus for receiving mutiview camera parameters for a stereoscopic image, the apparatus comprising:

a multiview camera parameter information extracting unit which extracts multiview camera parameter information for a predetermined data section from a received stereoscopic image data stream;

a matrix information extracting unit which extracts matrix information including at least one of translation matrix information and rotation matrix information for the predetermined data section from the multiview camera parameter information; and a multiview camera coordinate system restoring unit which restores coordinate systems of multiview cameras by using the matrix information, wherein the stereoscopic image data stream comprises a plurality of data sections, the plurality of data sections include a plurality of partial data respectively into which the stereoscopic image data is temporally divided, and the camera parameter information is individually set for each of the plurality of data sections.

11. The apparatus of claim 10, wherein the matrix information extracting unit extracts at least one of a camera focal length and additional parameter information for the predetermined data section, and the additional parameter information includes at least one of a center point of each camera and an aspect ratio of an image for the predetermined data section, wherein an amount of the additional parameter information transmitted is determined according to a degree of importance of the additional parameter information, and the degree of importance of the additional parameter information includes:

a first level at which the additional parameter information is not transmitted;

a second level at which only the aspect ratio of the image is transmitted;

a third level at which the aspect ratio of the image and the center point of the first view camera are transmitted, and the center point of the second view camera is identical with the center point of the first view camera; and a fourth level at which the aspect ratio of the image, the center point of the first view camera, and the center point of the second view camera are transmitted.

12. The apparatus of claim 10, wherein the matrix information extracting unit determines whether the rotation matrix information is to be extracted according to an arrangement of the first view camera and the second view camera, a parameter of the translation matrix information is a translation value of an origin of the coordinate system of the second view camera based on the coordinate system of the first view camera, and a parameter of the rotation matrix information is any one of:

a three axis rotation angle information of the second view camera with respect to the first view camera based on the first view camera; and one axis rotation angle information of the first view camera and the second view camera which are symmetric about a predetermined axis.

13. A method of transmitting multiview camera parameters for a stereoscopic image, the method comprising:

setting a coordinate system of a first view camera and a coordinate system of a second view camera for a predetermined data section for the stereoscopic image;

determining matrix information including at least one of a translation matrix and a rotation matrix for the predetermined data section from the set coordinate systems of the first and the second view cameras; and setting multiview camera parameter information for the predetermined data section by using the determined matrix information, wherein the stereoscopic image data stream comprises a plurality of data sections, the plurality of data sections include a plurality of partial data respectively into which the stereoscopic image is temporally divided, and the camera parameter information is individually set for each of the plurality of data sections.

14. The method of claim 13, wherein the setting of the multiview camera parameter information comprises setting at least one of a camera focal length and additional parameter information in the predetermined data section, wherein the additional parameter information comprises center points of the first and the second view cameras or an aspect ratio of an image for the predetermined data section, wherein an amount of the additional parameter information transmitted is determined according to a degree of importance of the additional parameter information, and the degree of importance of the additional parameter information includes:

a first level at which the additional parameter information is not transmitted;

a second level at which only the aspect ratio of the image is transmitted;

a third level at which the aspect ratio of the image and the center point of the first view camera are transmitted, and the center point of the second view camera is identical with the center point of the first view camera; and a fourth level at which the aspect ratio of the image, the center point of the first view camera, and the center point of the second view camera are transmitted.

15. The method of claim 13, wherein the setting of the coordinate systems of the first view camera and the second view camera comprises locating an origin of the coordinate system of the second view camera on one of coordinate axes of the coordinate system of the first view camera, wherein the determining of the matrix information comprises:

determining as a parameter of the translation matrix a translation value of an origin of the coordinate system of the second view camera with respect to one of coordinate axes of the coordinate system of the first view camera;

determining whether the rotation matrix information is to be set according to an arrangement of the first view camera and the second view camera, and determining as a parameter of the rotation matrix any one of three axis rotation angle information of the second view camera with respect to the first view camera based on the first view camera and one axis rotation angle information of the first view camera and the second view camera which are symmetric about a predetermined axis.

16. The method of claim 13, wherein the determining of the matrix information comprises:

determining as a parameter of the translation matrix information a translation value of an origin of the coordinate system of the second view camera based on the coordinate system of the first view camera; and determining whether the rotation matrix information is to be set according to an arrangement of the first view camera and the second view camera, and determining as a parameter of the rotation matrix any one of three axis rotation angle information of the second view camera with respect to the first view camera based on the first view camera, and one axis rotation angle of the first view camera and the second view camera which are symmetric about a predetermined axis.

17. The method of claim 13, further comprising:
receiving stereoscopic image data; and
recording the set multiview camera parameter information as metadata of the received stereoscopic image data.

18. The method of claim 17, wherein, if the stereoscopic image data is recorded in an international standardization organization (ISO) base media file format, the recording of the set multiview camera parameter information comprises recording the set multiview camera parameter information in the ISO base media file format.

19. The method of claim 18, wherein, if the ISO base media file format includes a moov box, an mdat box, and a meta box, the recording of the set multiview camera parameter information comprises recording the set multiview camera parameter information in at least one of a lower box of the meta box, a lower box of the moov box, a lower box of a trak box that is a lower box of the moov box, a lower box of a trak box, and a lower box of the meta box that is a lower box of the trak box.

20. An apparatus for transmitting multiview camera parameters for a stereoscopic image, the apparatus comprising:
a multiview camera coordinate system setting unit which sets a coordinate system of a first view camera and a coordinate system of a second view camera for a predetermined data section of the stereoscopic image;
a matrix information determining unit which determines matrix information including at least one of a translation matrix and a rotation matrix for the predetermined data section by using the set coordinate systems; and
a multiview camera parameter information setting unit which sets multiview camera parameter information for the predetermined data section by using the determined matrix information;
wherein the stereoscopic image data stream comprises a plurality of data sections, the plurality of data sections include a plurality of partial data respectively into which the stereoscopic image is temporally divided, and the camera parameter information is individually set for each of the plurality of data sections.

21. The apparatus of claim 20, wherein the multiview camera parameter information setting unit determines at least one of a camera focal length and additional parameter information for the predetermined data section, and
the additional parameter information includes at least one of a center point of each camera and an aspect ratio of an image for the predetermined data section,
wherein an amount of the additional parameter information transmitted is determined according to a degree of importance of the additional parameter information, and the degree of importance of the additional parameter information includes:
a first level at which the additional parameter information is not transmitted;
a second level at which only the aspect ratio of the image is transmitted;
a third level at which the aspect ratio of the image and the center point of the first view camera are transmitted, and the center point of the second view camera is identical with the center point of the first view camera; and
a fourth level at which the aspect ratio of the image, the center point of the first view camera, and the center point of the second view camera are transmitted.

22. The apparatus of claim 20, wherein the matrix information determining unit comprises:
a translation matrix information determining unit which determines as a parameter of the translation matrix a translation value of an origin of the coordinate system of the second view camera based on the coordinate system of the first view camera; and
a rotation matrix information determining unit which determines whether the rotation matrix information is to be set according to an arrangement of the first view camera and the second view camera, and determines as a parameter of the rotation matrix any one of three axis rotation angle information of the second view camera with respect to the first view camera based on the first view camera, and one axis rotation angle information of the first view camera and the second view camera which are symmetric about a predetermined axis.

23. The apparatus of claim 20, further comprising:
an input unit which receives stereoscopic image data; and
a multiview camera parameter information recording unit which records the set multiview camera parameter information as metadata of the received stereoscopic image data.

24. A non-transitory computer-readable recording medium having embodied thereon a program for executing the method of claim 1.

25. A non-transitory computer-readable recording medium having embodied thereon a program for executing the method of claim 13.

* * * * *